United States Patent Office 3,027,361
Patented Mar. 27, 1962

---

3,027,361
FIBER-REACTIVE POLYMERIC AZO DYES
Roy Emerson Starn, Jr., Wilmington, Del., assignor to E. I. du Pont de Nemours and Company, Wilmington, Del., a corporation of Delaware
No Drawing. Filed Dec. 19, 1958, Ser. No. 781,474
6 Claims. (Cl. 260—153)

This invention relates to novel compositions of matter useful as reactive dyes for materials possessing in their structure exchangeable hydrogen atoms. More particularly, this invention deals with dyes for textile fiber and similar materials (including paper, leather, plastic film, etc.) which possess in their molecules or micelles reactive radicals such as OH, ONa or $NH_2$. Common illustrations of such materials are cellulosic fiber, wool, silk, nylon and polyvinyl alcohol film.

It is an object of this invention to provide novel reactive dyes for fibers of the above types, which are characterized by a high degree of fixation, good build-up, and excellent fastness qualities to washing. A further object is to provide a novel series of dyes whereby the shade to be obtained on the fiber may be varied at will and determined in advance, during the synthesis of the dye. Other objects and achievements of this invention will become apparent as the description proceeds.

The nature of fiber-reactive dyes and their inherent shortcoming of low fixation are discussed at length in my copending application of same date herewith, Serial No. 781,480, filed jointly with S. N. Boyd, Jr. and D. J. Gale.

The said copending application also offers a solution to the above shortcoming by providing novel reactive dyes which are characterized by a polymeric structure each polymeric chain containing a plurality of chromophores possessing sulfo or carboxy groups, and a plurality of monochlorotriazine rings bound to the other portions of the molecule by NH groups, there being at least one such chlorotriazine ring per chromophore.

My present invention is concerned particularly with providing a generally applicable, efficient and economical process for synthesizing polymeric reactive dyes of the above type. Various other objects and achievements of this invention will appear as the description proceeds.

According to my invention a monomeric dye compound having two primary amino groups is reacted in substantially equimolecular proportions with a cyanuric halide, such as the chloride or bromide. Designating the monomeric dye diamine by the general formula $H_2N$—D—$NH_2$ and taking cyanuric chloride as representative of said halides, the general scheme of my synthesis involves elimination of HCl, and may be represented by the equation:

$$H_2N-D-NH_2 + Cl-G-Cl \xrightarrow{-HCl}$$
$$\ldots -NH-D-NH-G-NH-D-NH-G-\ldots$$

wherein D is the divalent radical of a compound containing at least one chromophore and at least one water-solubilizing group (sulfo or carboxy) per chromophore, while G represents the divalent, monochlorotriazine radical

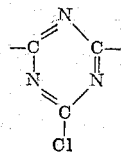

Actually, however, my process is carried out in two successive stages, involving different temperature levels, the dye being dissolved in water, while the cyanuric chloride is dissolved in a convenient water-miscible solvent, for instance acetone, or is simply dispersed in the aqueous medium.

The first temperature stage is about 0° to 5° C., and is believed to result in a monomer of the formula $$H_2N-D-NH-G-Cl$$

In the second stage, which is carried out at a temperature of 10° to 70° C., the said monomer condenses further to give a polymer of the above indicated structure, containing at least two repeating units and two radicals G. The upper limit of the number of repeating units is immaterial as long as the recovered polymer still possesses the quality of being soluble in water to a concentration commonly used in dye baths (about 0.5 to 4% by weight).

Because of the random nature of the condensation process, and because there may be present during the second stage some residual, uncondensed molecules of form $H_2N$—D—$NH_2$ and Cl—G—Cl, each polymeric chain may contain at either of its terminals, a radical selected at random from the group D—$NH_2$ and G—Cl. But because of the strong tendency of the cyanuric chloride to hydrolyze in the presence of water at temperatures above 20° C., the bulk of the terminal G—Cl groups will be replaced by G—OH, in other words, the radical of form

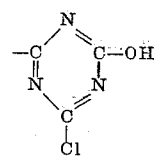

Consequently, the polymeric chains will terminate, at either end, in radicals selected at random from the group consisting of D—$NH_2$, G—Cl and G—OH.

In the average case, all the D's in the polymer will be alike. It is possible, however, to start with a mixture of dye-diamines say of form $H_2N$—D—$NH_2$ and $H_2N$—D'—$NH_2$, whereby the resulting polymeric chains will contain the dye radicals D and D' intermixed at random, the average ratio of D' to D being, however, proportional to the original ratio of the two dye diamines. In this fashion, the shade or other quality of the eventual dyeing may be modified at will and predetermined in advance. For instance if an orange azo dye of form $H_2N$—D'—$NH_2$ is intermixed with a blue azo dye of form $H_2N$—D—$NH_2$ in suitable proportions, prior to condensation with cyanuric chloride, grey and black dyes may be prepared.

Of course, it is possible to synthesize the said monomer of formula $H_2N$—D—NH—G—Cl in the course of synthesizing the initial dye. In such event, of course, my process of making the polymer may consist of a single stage only, namely the second of the aforementioned two temperature stages.

The process of synthesis according to this invention has the special advantage that it is independent of the nature of D in said initial dye molecule, and may be applied therefore to cases where D represents the radical of an azo dye, a dye of the anthraquinone, dioxazine, or phthalocyanine series, or any other type of dye, provided it contains two $NH_2$ groups and sufficient water-solubilizing groups to make the ultimate product water-soluble.

Without limiting this invention the following examples are given to illustrate my preferred mode of operation. Parts mentioned are by weight.

*Example 1*

2-(p-aminoanilino)-5-nitrobenzenesulfonic acid is diazotized in conventional manner and coupled in alkaline solution to the monosodium salt of H acid (8-amino-1-naphthol-3,6-disulfonic acid). After salting out and filtering off, the resulting filter cake is subjected to reduction in customary manner with sodium sulfide, to convert the NO$_2$ group into NH$_2$. The product when isolated is a blue powder, and has the formula

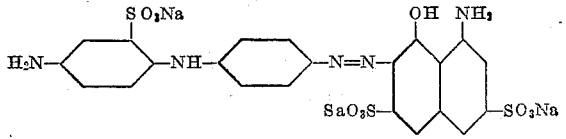

A quantity of the above blue powder containing 13.5 parts (0.02 mole) of diaminoazo dye (the actual quantity being adjusted for salt content or other solid diluents) is dissolved in 500 parts of water and the solution is adjusted to pH 7 and cooled to 5° C.; 2.8 parts of crystalline sodium acetate are then added. Then 40 parts of an acetone solution containing 3.7 parts (0.02 mole) of cyanuric chloride are added. The solution is stirred for one hour at a temperature between 0° and 5° C. while maintaining the pH between 6 and 7 by adding 2 N sodium hydroxide.

At this point, the mass is believed to contain in solution a monomer of the formula

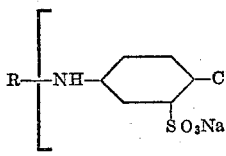

wherein D represents the formula of the above blue azo dye minus its two NH$_2$ groups.

The solution is then warmed to room temperature, stirred for 18 hours, warmed to 40° to 45° C. and stirred an additional 45 minutes. After adjusting the pH to 7.5 with 2 N sodium hydroxide solution, 120 parts of sodium chloride are added, the product is filtered off and dried under a vacuum. The resultant powder dissolves in water to give a blue coloration.

The blue, water-soluble polymer obtained is believed to have the following formula:

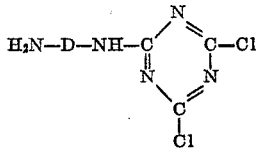

wherein $n$ is not less than 2; R represents H, GCl or GOH (G having the same meaning as above; i.e. it represents the monochlorotriazine radical C$_3$N$_3$Cl); and R' represents Cl, OH or a molecule of said diamino monoazo blue dye attached by one of its amine groups.

Example 2

4-amino-4'-nitro-2,2'-stilbenedisulfonic acid is diazotized in conventional manner and coupled, in alkaline medium, to 1-(m-aminophenyl) - 3 - methyl - 5 - pyrazolone. After salting out and filtering off, the mononitro product is reduced to the NH$_2$ stage, by the aid of sodium sulfide, in conventional manner. The product, when isolated, is an orange powder having the formula

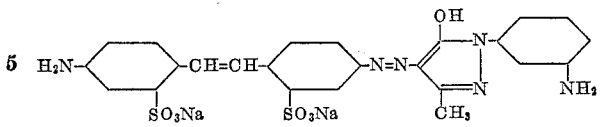

A quantity of the above powder containing 13.5 parts of the pure dye (0.022 mole) is dissolved in 250 parts of water. The solution is adjusted to pH 7, cooled to 5° C. and 2.8 parts of crystalline sodium acetate are added. Then 40 parts of an acetone solution containing 3.7 parts (0.02 mole) of cyanuric chloride are added. The solution is stirred for one hour at a temperature between 0° and 5° C. and for another hour at a temperature between 20° and 25° C. while maintaining the pH between 6 and 7 by adding 2 N sodium hydroxide. The solution is then warmed to 40° to 45° C. for 45 minutes, salted and filtered. The orange colored polymer thus obtained is dried in a vacuum. The resulting orange powder dissolves in water to give an orange coloration. The orange, water-soluble polymer thus obtained is believed to have the following formula:

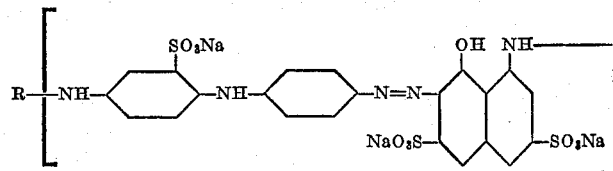

wherein $n$ is not less than 2; R represents H, GCl or GOH; and R' represents Cl, OH or a bond to either amino group of the diamino monoazo orange dye employed as starting material for the condensation.

Example 3

The condensation step of Example 1 is repeated, except that in lieu of using 13.5 parts of the blue diaminoazo dye, a mixture containing 10.8 parts of said blue dye and 2.7 parts of the orange diaminoazo dye of Example 2 is employed. The resulting copolymer, when isolated as in Example 1, is a black powder, dissolving in water to give a black coloration.

Example 4

34.7 parts of 4,4'-diamino-2,2'-biphenyldisulfonic acid were tetrazotized in conventional manner and coupled in alkaline solution to 52.2 parts of 2-amino-8-naphthol-6-sulfonic acid. To the resulting ice cold mass, containing in solution the disazo dye of formula

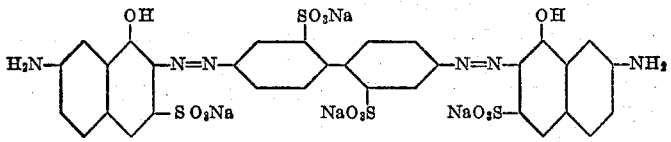

is added a solution of 18.5 parts of cyanuric chloride in 80 parts of acetone, and the whole is agitated for 1.5 hours at 0° to 5° C., while maintaining the pH at 8 with 2 N Na$_2$CO$_3$. The reaction mass is then heated at 35° to 40° C. for 2 hours during which time the pH is held at 8 by adding 2 N Na$_2$CO$_3$ to neutralize the HCl formed in the reaction. The solution is cooled to 20° C., salted, filtered and the filter cake is dried. The resulting polymeric product is a red dye. Its structure corresponds to the general formula hereinabove, except that D here is the divalent radical of the disazo dye indicated by the above formula.

Example 5

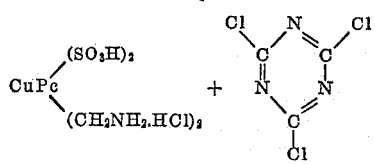 + 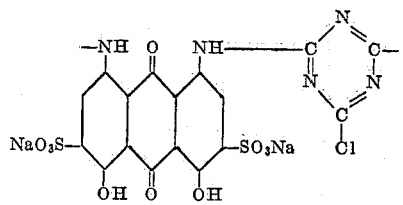

43.3 parts (0.05 mole) of the di-HCl salt of copper di(aminomethyl)-phthalocyanine-disulfonic acid are dissolved in 100 parts of water while keeping the pH at 6 with 2 N Na$_2$CO$_3$, and the solution is cooled to 0° to 5° C. A solution of 18.5 parts (0.1 mole) of cyanuric chloride in 80 parts of acetone is added, with enough ice to keep the temperature of the mixture below 5° C. The resulting slurry is agitated at 0° to 5° C. for 2 hours; then the pH is adjusted to 6 with 2 N Na$_2$CO$_3$, and the solution is stirred at room temperature for 24 hours. The pH is adjusted to 7 with 2 N Na$_2$CO$_3$, and the polymeric dye is isolated by salting and filtering. A polymeric copper phthalocyanine dye which dyes cotton turquoise shades with good wash-fastness is obtained.

The aminomethyl-phthalocyanine starting material is prepared by adding N-hydroxymethyl-phthalimide to a solution of copper phthalocyanine in 10% oleum at 80° C. followed by drowning on ice and hydrolyzing the resulting amide with 10% HCl.

Example 6

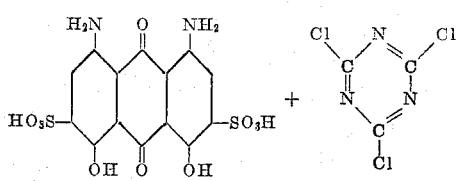 + 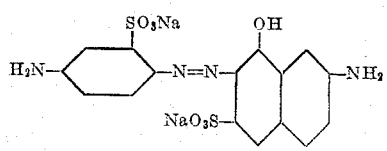

48.9 parts (0.1 mole) of 1,8-diamino-4,5-dihydroxy-3,6-anthraquinone-disulfonic acid are dissolved in 100 parts of water while keeping the pH at 6 with 10 N NaOH. The solution is cooled to 0° to 5° C., and a solution of 18.5 parts (0.1 mole) of cyanuric chloride in 80 parts of acetone is added, together with enough ice to keep the temperature at 0° to 5° C. The resulting slurry is agitated at 0° to 5° C. for 2 hours; the pH is then adjusted to 6 with 2 N Na$_2$CO$_3$, and the solution is stirred at room temperature for 48 hours.

The pH is then adjusted to 7 with 2 N Na$_2$CO$_3$ and the blue dye is filtered off. A polymeric anthraquinone dye which dyes cotton blue shades with good wash-fastness is obtained. The internal unit of the polymeric dye has the probable structure

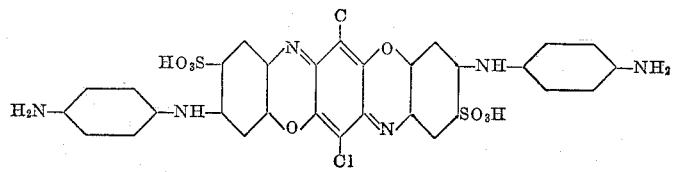

Example 7

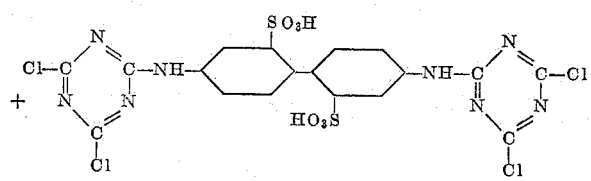

36.4 parts (0.05 mole) of the blue diaminodioxazine shown above is slurried in 500 parts of water and the pH is adjusted to 6 with 2 N Na$_2$CO$_3$.

A solution of 17.2 parts (0.05 mole) of 4,4'-diamino-2,2'-biphenyldisulfonic acid in 100 parts of water is prepared while keeping the pH at 7 with solid Na$_2$CO$_3$. The pH is then adjusted to 6 with 2 N HCl and the solution is cooled to 0° to 5° C. To this solution is added a solution of 18.5 parts (0.1 mole) of cyanuric chloride in 80 parts of acetone along with enough ice to keep the temperature below 5° C. The resulting slurry is stirred at 0° to 5° C. for 2 hours before the pH is adjusted to 6 with 2 N Na$_2$CO$_3$, and the above slurry of the diaminodioxazine is added. The resulting slurry is agitated at room temperature for 24 hours before the pH is adjusted to 7 with 2 N Na$_2$CO$_3$. The dye is then isolated by salting (using 50 parts of NaCl) and filtering. A polymeric blue dye with good light- and wash-fastness is obtained.

Example 8

If the diaminodioxazine dye in Example 7 is replaced by 23.8 parts (0.05 mole) of the diaminoazo dye represented by the formula $$H_2N-\bigcirc-N=N-\bigcirc-NH_2$$
(with SO$_3$Na, OH, NaO$_3$S substituents)

a violet polymeric reactive dye is formed which shows excellent wash fastness when dyed on cotton.

It will be understood that the details of the above examples may be varied widely without departing from the spirit of this invention. For instance, instead of preparing the intermediate monomers or isolating the final polymers as sodium sulfonates, they may be prepared and isolated in the form of any other convenient alkali-metal sulfonates, for instance those of potassium or lithium. Other variations and modifications will be readily apparent to those skilled in the art.

I claim as my invention:

1. A process of producing a water-soluble polymeric fiber-reactive dye, which comprises condensing in aqueous medium, in the presence of an acid absorbing agent and at a temperature between 10° and 70° C. a water soluble dye monomer of the formula $$H_2N-D-NH-G-Cl$$

wherein D is the divalent radical of a compound containing from one to two chromophores and from one to three water-solubilizing radicals per chromophore, and G represents the monochlorotriazine radical

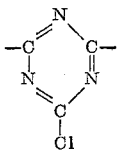

2. The process of producing a water-soluble, polymeric fiber-reactive dye, which comprises reacting at 0° to 5° C., in the presence of an acid absorbing agent, and in essentially equimolecular ratio, cyanuric chloride and a dye containing two $NH_2$ groups and from one to three sulfonic acid groups, whereby to produce a monomeric condensation product, and then further reacting the same mass at a temperature between 10° and 70° C. to effect polymerization of said monomer.

3. A process as in claim 2, wherein the initial dye is a single compound of the formula $H_2N-D-NH_2$, D being the divalent radical of a compound which has from one to two chromophores and from one to three water-solubilizing groups per chromophore.

4. A process as in claim 2, wherein the initial dye is a mixture of two compounds of formulas $H_2N-D-NH_2$ and $H_2N-D'-NH_2$, in which D and D' represent radicals of different compounds each of which contains from one to two chromophores and from one to three water-solubilizing groups per chromophore.

5. A process as in claim 2, wherein the reaction is carried out in an aqueous medium, whereby dichlorotriazine radicals which take up terminal positions have one of their Cl groups replaced, by hydrolysis, by an OH group.

6. A process as in claim 5, wherein the aqueous reaction mass is salted out in the end, whereby any sulfo and carboxy groups in the polymeric dye compound are converted into the form $SO_3Na$ and $COONa$, respectively.

References Cited in the file of this patent

UNITED STATES PATENTS

| | | |
|---|---|---|
| 2,268,919 | Anderau | Jan. 6, 1942 |
| 2,391,164 | Kaiser | Dec. 18, 1945 |
| 2,470,769 | Gaspar | May 24, 1949 |
| 2,763,640 | Riat et al. | Sept. 18, 1956 |
| 2,824,093 | Benz et al. | Feb. 18, 1958 |
| 2,835,663 | Benz | May 20, 1958 |
| 2,844,574 | Gaspar et al. | July 22, 1958 |

FOREIGN PATENTS

| | | |
|---|---|---|
| 754,071 | Great Britain | Aug. 1, 1956 |

OTHER REFERENCES

Fierz-David et al.: "J. Soc. Dyers and Colourists," vol. 53, 1937, pages 424-431.

UNITED STATES PATENT OFFICE
CERTIFICATE OF CORRECTION

Patent No. 3,027,361                                              March 27, 1962

Roy Emerson Starn, Jr.

It is hereby certified that error appears in the above numbered patent requiring correction and that the said Letters Patent should read as corrected below.

Column 2, line 11, for "radials" read -- radicals --; column 3, lines 7 to 12, the formula should appear as shown below instead of as in the patent:

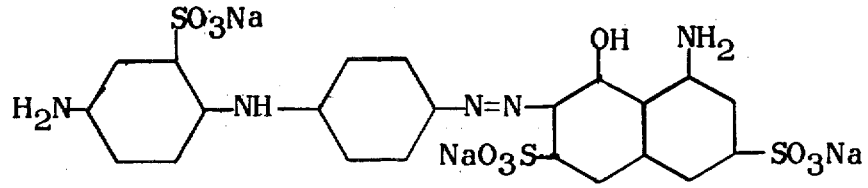

column 4, line 1, for "is", first occurrence, read -- in --.

Signed and sealed this 17th day of July 1962.

(SEAL)
Attest:
ERNEST W. SWIDER
Attesting Officer

DAVID L. LADD
Commissioner of Patents